(No Model.)

F. H. KINDER.
SELF SUPPORTING ATTACHMENT FOR BICYCLES.

No. 525,954. Patented Sept. 11, 1894.

Witnesses
A. Edmunds
Jas. E. Edmunds

Inventor
Frederick H. Kinder
By P. J. Edmunds
Atty

UNITED STATES PATENT OFFICE.

FREDERICK H. KINDER, OF STRATHROY, CANADA.

SELF-SUPPORTING ATTACHMENT FOR BICYCLES.

SPECIFICATION forming part of Letters Patent No. 525,954, dated September 11, 1894.

Application filed June 6, 1892. Serial No. 436,172. (No model.)

*To all whom it may concern:*

Be it known that I, FREDERICK H. KINDER, a subject of the Queen of Great Britain, and a resident of Strathroy, in the Province of Ontario, Canada, have invented a new and useful Self-Supporting Attachment for Bicycles, of which the following is a full, clear, and exact description.

At present, when a bicycle rider dismounts for a short time, and wishes to leave his bicycle, if the latter has no self supporting attachment it is usually placed against a building or other object, when convenient, and in order to hold it engaged with the object, the wheels must be very carefully adjusted in a certain position; but different objects require different adjustment of the wheels, the proper adjustment being found by the rider, only, after trying various adjustments. When held in this manner however, the slightest jar will very often alter the adjustment of the wheels, the result of which is, the fall of the bicycle and considerable damage thereto, or if an object is not convenient, to place the bicycle against, it is placed flat on the ground, when it becomes covered with dirt and dust, all of which is completely prevented by using my invention.

The object of my invention is to provide a simple, inexpensive and durable self supporting attachment for a bicycle, which will not interfere with the rider, and at the same time may be instantly adjusted to support the machine when stationary; and it consists of the improved construction and combination of parts of the same, as will be hereinafter first fully set forth and described, and then pointed out in the claims.

Figure 1:
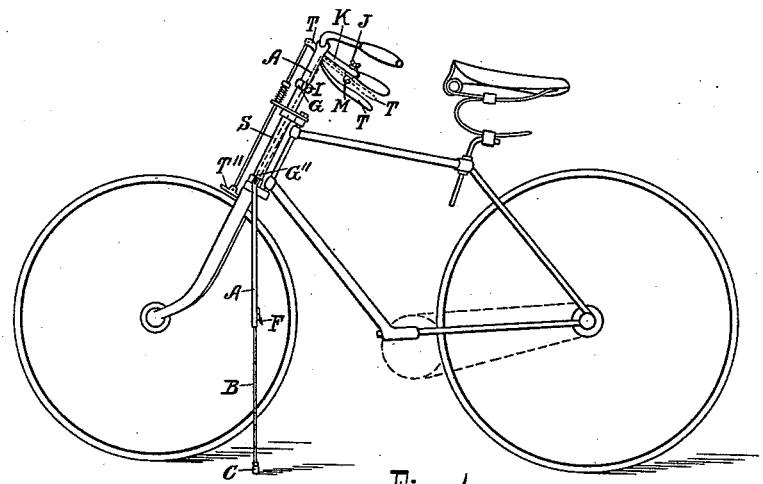
Figures 2, 3:
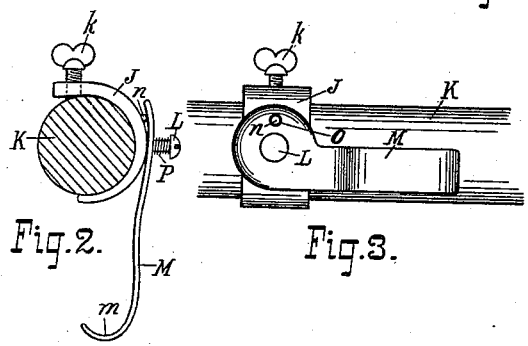
Figure 6:
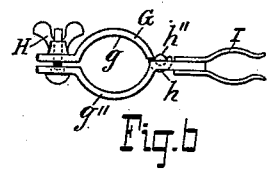
Figure 5:
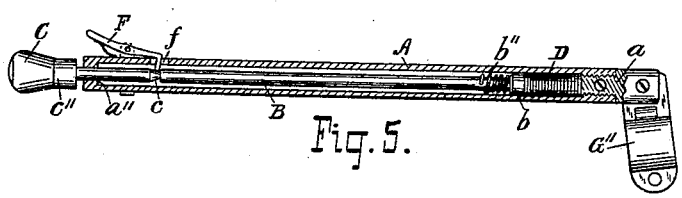
Figure 4:
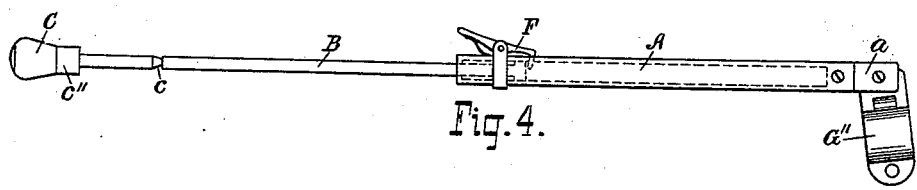

In the accompanying drawings, Figure 1, is a side view of a bicycle, illustrating my invention. Fig. 2, is an enlarged detail cross sectional view of the handle, and a side view of the brake lock attached thereto, showing the brake lock in its vertical position. Fig. 3, is a rear view of same, showing the brake lock in its horizontal position. Fig. 4, is an enlarged detail side view of the extensible stay, in its extended position. Fig. 5, is another view of same, having one of the sections cut away, and the stay in its contracted position. Fig. 6, is an enlarged detail plan view of the clip, and device, which secures it to the handle bar.

A. B. designate an extensible stay, which may be formed of two bars, one sliding on, or within the other. The latter construction is preferable, and is shown in the accompanying drawings, wherein—

A. designates a tubular bar, formed with the slot $f$, into one end of which bar, a plug, $a$, is screwed, or otherwise secured, and on the interior face, at the other end of this bar, a shoulder, $a''$, is formed.

B. is a bar, which slides into the tube, A, and this bar, B, is formed with the shoulder, $b$, spring, $b''$, and recess $c$.

C. is a knob of rubber or other suitable material provided with the ferrule, $c''$, into which knob the end of the bar, B, is screwed, or otherwise firmly secured.

D. designates a coil spring, placed in the tubular bar, A, between the plug, $a$, and the end of the bar, B, to project a portion of the bar, B, out of the tube, A, when required.

F. designates a spring actuated dog, pivoted on the tubular bar, A, a portion of which dog extends through the slot, $f$, and engages with the bar, B, in the tube, A, to hold said bars, A, and B, at the different positions to which they may be adjusted.

G. designates a circular clasp, formed in two pieces, $g$, $g''$, as shown in Fig. 6, and these pieces at one end are held together by a thumb nut and bolt, H, which also regulates the compression of the clasp on the handle bar, S, or other part to which said clasp, G, may be attached; and these pieces, $g$, $g''$, are held together at the other end by the curved or hooked portion, $h$, on one engaging with a cross bar, $h''$, on the other, the piece, $g''$, being preferably cut away, to facilitate the engagement of said hook with said bar, and to this clasp, G, the clip, I, is secured as shown in Fig. 6, and to another similar clasp, the tubular bar, A, is pivotally secured. These clasps, G, G'', secure the clip, I, and tubular bar, A, to the handle bar, S.

J. designates a semi-circular clasp, formed with the projection, $n$. This clasp, J, is secured to the handle, K, by a thumb set screw, $k$; and L, is a stud pin secured to the clasp, J.

M. is a locking plate, formed with a hooked or curved portion, m, and this locking plate, M, is secured on the stud pin, L, and provided with the recess, O.

P. is a spring, encircling the stud pin, L, between the head of said pin, and the plate, M, to hold said plate in contact with the clasp, J.

The devices used to carry out this improvement may be readily and easily attached to any machine, to those already in use as well as to those in process of construction.

To secure this attachment to a bicycle, all that is necessary to do, is to attach the clasp, J, to the handle K, and the clasps, G G'', to the handle bar, S, at about the positions shown in Fig. 1. The clasp, J, is attached to the handle, K, as shown in Figs. 1, 2 and 3, so that the brake lever, T, when being raised toward the handle K, will click or snap over the lower curved portion, m, of the lock, M, and lock said lever in this position. By raising the lever, T, to the position shown by dotted line, T, the brake, T'', connected therewith will be lowered to press on the tire of the front wheel. This will securely prevent the wheels from moving lengthwise until at the pleasure of the rider, the lever, T, is released from the lock, M. This lever lock, M, is pivotal on the stud pin, L, so that when it is not required for use, it may be pivotally raised parallel with the handle bar, to the position shown in Fig. 3. When in this position, the projection, n, on the clasp, J, engages with the recess, O, in the lock, M, and they are held engaged by the small coil spring, P, which prevents their accidental displacement, until the rider wishes to use the lock again, when he can readily and easily compress the spring, P, and release the lock, M, from the projection, n, and adjust it to the position shown in Fig. 2.

The clasps, G, are secured to the handle bar, by removing the thumb nut, H, and placing the parts, g, and g'', around the handle bar, then bringing and securing the open ends of the clasps, G, together and to the handle bar, by the thumb nuts and bolts, H. To the upper clasp, G, the clip, I, is rigidly secured; an enlarged plan view of this clasp and clip, I, being shown in Fig. 6,—and to the lower clasp, G'', the extensible stay is pivotally secured.

When the extensible stay, A, B, is raised to extend upward from the lower clasp, G'', parallel with, and beside the handle bar, to the position shown by dotted line, A, Fig. 1, it may be pressed into the clip, I, which will securely retain said stay, A, in an upright position out of the way, and by releasing the dog, F, from the bar, B, the latter may be pressed into the part, A, to the position shown in Fig. 5, and held in this position, by the spring dog, F, engaging with the recess, c. This compresses the spring, D. The whole attachment will then occupy a narrow space only, parallel with and beside the handle bar, and completely out of the way of the rider, and in no way interfere with him when riding.

After dismounting and wishing to rigidly stay or support his machine in an upright position, the rider raises the brake lever, T, until it engages with the lock, M. This compresses the brake, T'', on the tire of the front wheel, and prevents either of the wheels from moving. He then disengages the tube, A, from the clip, I, and disengages the dog, F, from the recess, c, in the bar, B. This permits the compressed spring, D, to act and force part of the bar, B, out of the tube, A, to the position shown in Figs. 1 and 4, the shoulders, a'', and b, preventing one from falling out of, or disengaging from the other, and the spring, b'', prevents these shoulders from being injured when coming together, and when in this extended position, the engagement of the dog, F, with the end of the bar B, as shown in Fig. 4, prevents the latter from accidentally sliding back and forth in the tube, A. This stay, A, B, is then placed at an angle to the machine and the latter inclined to one side, so that the lower end of the bar, B, will rest on the sidewalk, road or ground, to rigidly and firmly hold this machine in an upright position, without other support than said stay.

Having thus described my invention, I claim—

1. A pivotal locking plate, M, formed with a hooked or curved portion, m, and a recess, O, a clasp, J, provided with projection, n, and the stud pin, L, and coil spring, P, in combination with the handle, K, lever, T, and brake, T'', and means for connecting said lever with said brake, substantially as shown.

2. The tubular bar, A, formed with the plug, a, shoulder, a'', and slot, f, in combination with the bar, B, formed with the shoulder, b, and recess, c, the spring dog, F, and means for securing the tubular bar, A, to the handle bar or other suitable support on the bicycle, substantially as shown and described, and for the purpose specified.

3. The tubular bar, A, formed with the plug, a, shoulder, a'', and slot, f, and the bar, B, formed with the shoulder, b, and recess, c, the knob, C, and spring dog, F, in combination with the springs, b'', and D, substantially as shown and described and for the purpose specified.

In testimony whereof I affix my signature in the presence of the two undersigned witnesses.

FREDERICK H. KINDER.

Witnesses:
P. J. EDMUNDS,
JAS. EDMUNDS.